United States Patent
Lankford, Jr.

(10) Patent No.: US 6,742,254 B1
(45) Date of Patent: Jun. 1, 2004

(54) METHOD OF MANUFACTURING A CAMSHAFT

(76) Inventor: Fred S. Lankford, Jr., 4370 Highway 109 N., High Point, NC (US) 27265

( * ) Notice: Subject to any disclaimer, the term of this patent is extended or adjusted under 35 U.S.C. 154(b) by 0 days.

(21) Appl. No.: 09/923,489

(22) Filed: Aug. 8, 2001

(51) Int. Cl.[7] .................................................. B23P 6/00
(52) U.S. Cl. ............... 29/888.1; 29/402.08; 29/402.03; 29/888.011
(58) Field of Search ............................ 29/888.08, 888.1, 29/888.011, 401.1, 402.01, 402.03, 402.04, 402.06, 402.08, 402.09, 402.11, 402.12, 402.14, 402.15, 893.1, 893.2; 74/597, 598, 595; 451/49, 51

(56) References Cited

U.S. PATENT DOCUMENTS

| | | | | |
|---|---|---|---|---|
| 2,730,912 A | * | 1/1956 | Marinelli | 74/597 |
| 4,031,769 A | * | 6/1977 | Kassing | 74/448 |
| 4,046,028 A | * | 9/1977 | Vachris | 74/597 |
| 4,205,423 A | * | 6/1980 | Poole et al. | 29/402.11 |
| 4,561,837 A | * | 12/1985 | Berges et al. | 29/445 |
| 4,751,900 A | * | 6/1988 | Ruffolo | 123/190.6 |
| 4,763,542 A | * | 8/1988 | Darin | 29/402.06 |
| 5,207,120 A | * | 5/1993 | Arnold et al. | 29/888.08 |
| 6,125,713 A | * | 10/2000 | Langlois et al. | 29/402.08 |
| 2002/0020371 A1 | * | 2/2002 | Jesel | 74/567 |

* cited by examiner

Primary Examiner—Gregory Vidovich
Assistant Examiner—Marc Jiminez

(57) ABSTRACT

Internal combustion engine performance can be enhanced by precise cylinder firing. To accomplish this objective, a preferred billet camshaft rebuilding method provides removing and replacing the distributor drive gear on the camshaft for precise alignment therewith. The method also demonstrates the detailed steps required to carry out the camshaft rebuilding process and the manufacture of a one-part distributor drive gear. An alternate method of using a two-part distributor drive gear on a camshaft is also described for camshafts having an interior distributor drive gear.

7 Claims, 6 Drawing Sheets

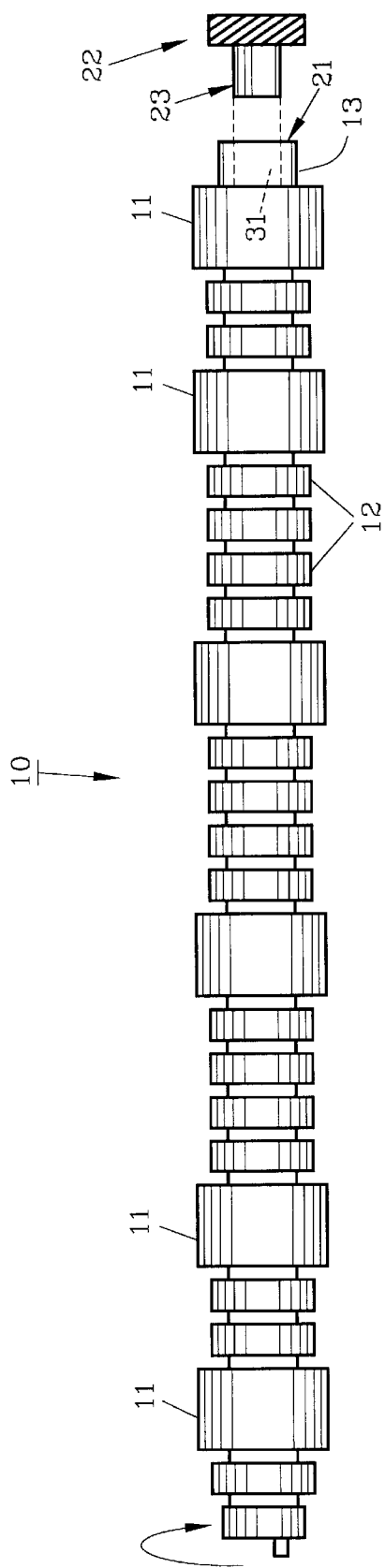
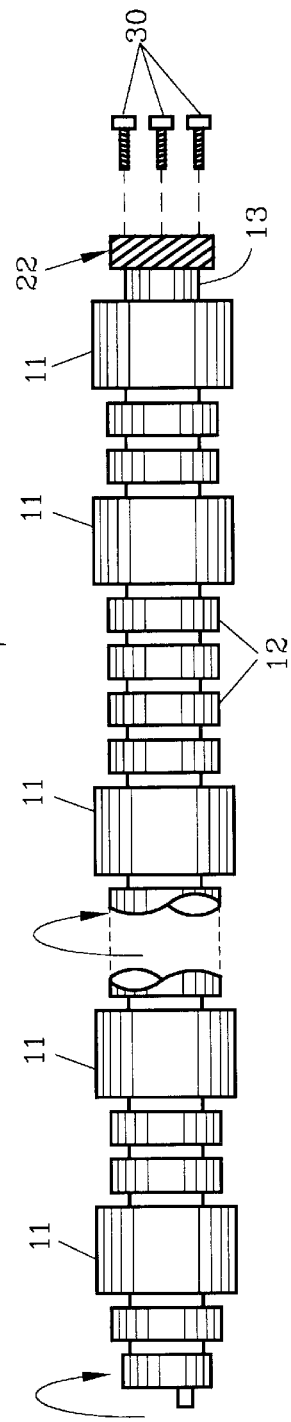
FIG. 4
FIG. 5

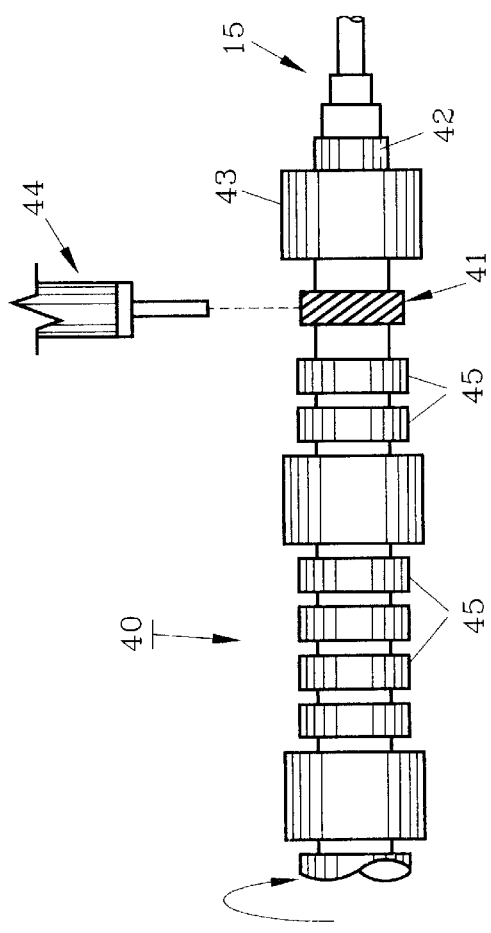
FIG. 9
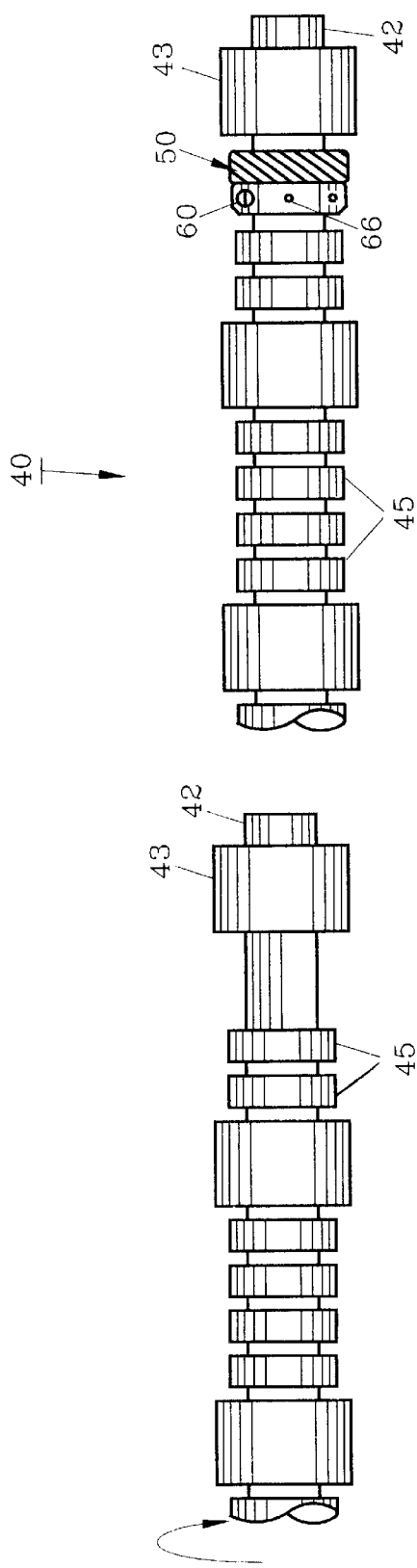
FIG. 14
FIG. 10

US 6,742,254 B1

METHOD OF MANUFACTURING A CAMSHAFT

FIELD OF THE INVENTION

The invention herein pertains to internal combustion engines and particularly pertains to a method for rebuilding an engine camshaft to provide improved performance and efficiency.

DESCRIPTION OF THE PRIOR ART AND OBJECTIVES OF THE INVENTION

Sanctioned vehicle racing of motor vehicles has become increasingly popular in recent years with higher speeds and technological advances. Engine builders for racing vehicles have sought various ways to improve the performance and fuel efficiency in order to be more competitive. Racing and other engines commonly utilize "billet" type camshafts which are integrally formed such as by conventional machining. Billet type camshafts include cams positioned thereon and at the rear thereof have a distributor drive gear. Once the camshaft has been machined, it is then polished and subjected to high temperature treatments to improve its hardness and durability. Thereafter, the cams are usually ground and finished however, the distributor drive gear is often slightly askew from the longitudinal axis of the camshaft due to the high temperature treatments, although it will engage the distributor drive shaft gear and seemingly, properly operate. Upon close inspection however, the distributor drive gear is slightly out of alignment causing engine performance (cylinder firings) to be somewhat off, resulting in lower power and fuel economy.

Thus, with the problems and disadvantages of conventional distributor drive gears which are integrally formed on billet type camshafts, the present invention was conceived and one of its objectives is to provide a method for rebuilding a billet type camshaft to insure improved engine performance.

It is another objective of the present invention to provide a camshaft which has a distributor drive gear properly aligned on the main shaft and is attached by threaded members.

It is yet another objective of the present invention to provide a method for rebuilding a camshaft which can be readily done by those skilled in the art without extensive training or special equipment.

It is still another objective of the present invention to provide a distributor drive gear which can be substituted for a standard billet distributor drive gear after removal thereof.

Various other objectives and advantages of the present invention will become apparent to those skilled in the art as a more detailed description is set forth below.

SUMMARY OF THE INVENTION

The aforesaid and other objectives are realized by first removing the distributor drive gear from a standard billet type camshaft such as by cutting using a conventional lathe. Next in the preferred method, the rear face of the main shaft which has been cut is finished and made true. The face is then drilled to form a bore in the main shaft. A substitute one-part distributor drive gear having a shank extending therefrom is then placed thereon in the preferred embodiment. Machine screws are used to affix the new distributor drive gear to the camshaft and a mounting pin is also employed. In an alternate embodiment for billet camshafts having an interior distributor drive gear, the original distributor drive gear is removed and a new two-part distributor drive gear is affixed to the main camshaft. Thus, with these steps taken the distributor drive gear is now in proper alignment with the longitudinal axis of the camshaft for better engine performance and increased fuel economy.

BRIEF DESCRIPTION OF THE DRAWINGS

FIG. 4 pictures the camshaft as removed from the lathe after drilling and prior to the placement of the new distributor drive gear thereon;

FIG. 5 depicts the camshaft as seen in FIG. 4 in fragmented form prior to attachment of the substituted distributor drive gear with machine screws;

FIG. 9 shows another type of conventional billet camshaft in schematic, fragmented fashion as mounted on a lathe;

FIG. 10 depicts the camshaft in FIG. 9 after the distributor drive gear has been removed;

FIG. 14 illustrates the distributor drive gear as seen in FIG. 11 mounted on the camshaft as shown in FIG. 10.

DETAILED DESCRIPTION OF THE PREFERRED EMBODIMENTS AND OPERATION OF THE INVENTION

Figure 1:
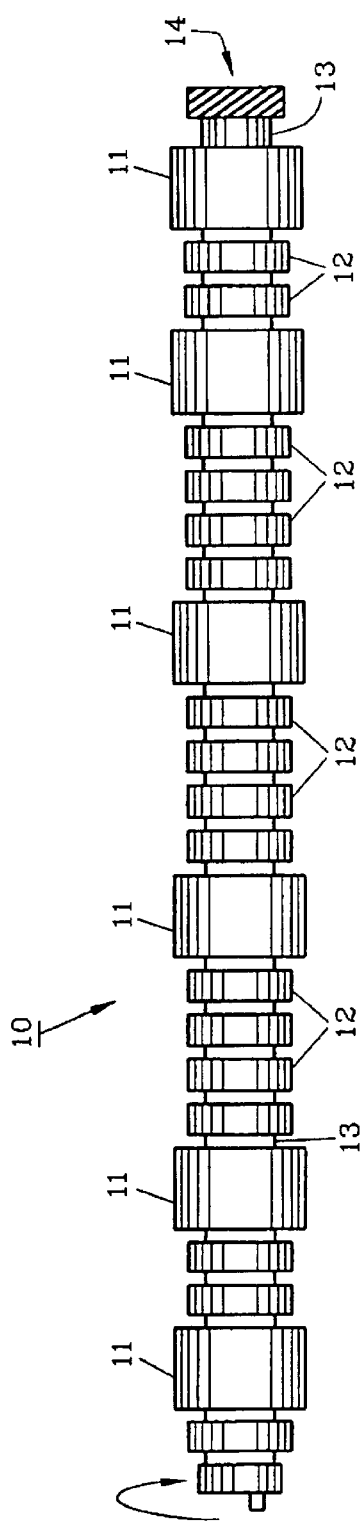
FIG. 1 shows in schematic representation a typical commercially available billet type camshaft as for certain eight (8) cylinder internal combustion Dodge engines.

For a better understanding of the invention and its operation, turning now to the drawings, FIG. 1 demonstrates in schematic representation a typical billet camshaft 10 for an eight (8) cylinder internal combustion engines as used in a Dodge P7 racing engine. Typical billet type camshaft 10 as manufactured by various companies includes journal 11, cams 12, main shaft 13 and distributor drive gear 14, all integrally formed by machining as is conventional in the trade. For simplicity, cams 12 are shown schematically without lobes and as would be understood, in reality such cams are shaped differently from those as illustrated herein.

As earlier explained, distributor drive gear 14 in FIG. 1 appears properly aligned along the longitudinal axis of main shaft 13, however due to the heat treatment and other process steps used in manufacturing billet camshaft 10, distributor drive gear 14 are generally not precisely aligned and therefore will lessen engine performance. Thus, for improved performance, distributor drive gear 14 is removed and replaced on main shaft 13 explained as for the preferred method of rebuilding camshaft 10 in detail below.

Figure 2:
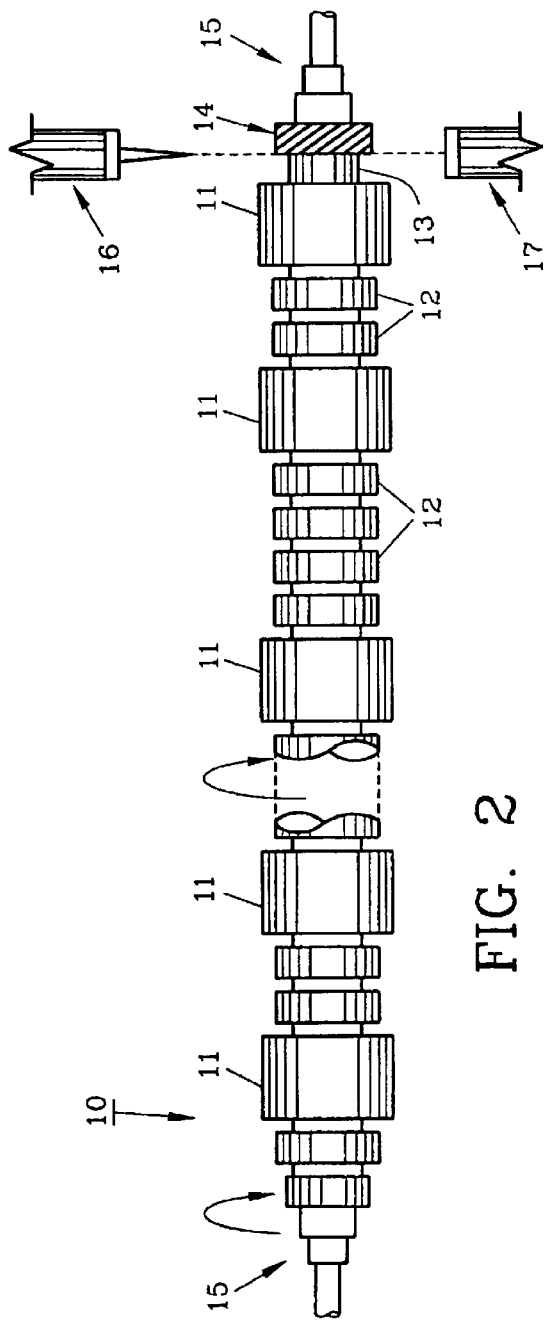
FIG. 2 illustrates the camshaft of FIG. 1 in fragmented fashion positioned in a lathe with schematic means for cutting away the distributor drive gear proximate thereto.

The preferred method of modifying billet camshaft 10 is illustrated, first in FIG. 2 as camshaft 10 is first placed in a conventional metal working lathe 15 where it is turned and distributor drive gear 14 removed such as by cutting with preferably standard lathe cutting tool 16 seen schematically. Other means such as laser 17, also in schematic representation in FIG. 2 could be used. Different tools could also be used to remove distributor drive gear 14 from main shaft 13 such as for example, a hacksaw (not seen) or other conventional means. However, distributor drive gear 14 is preferably removed by cutting while on a lathe.

Figure 3:
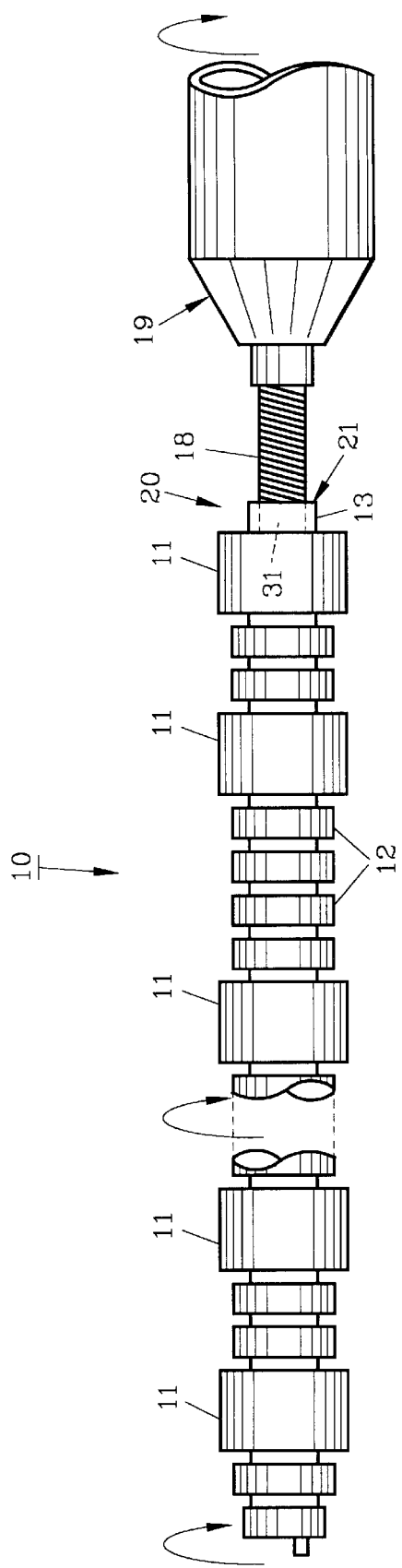
FIG. 3 demonstrates the rear end or face of the main shaft being bored after the distributor drive gear has been removed.

With distributor drive gear 14 removed from main shaft 13, end 20 of main shaft 13 is then ground and made true along face 21. Main shaft 13 is then drilled to form bore 31 (through face 21) as shown in FIG. 3 by drill bit 18 positioned in drill press 19, preferably while on lathe 15. Drill bit 18 is a conventional diamond tipped drill bit as known in the trade. Once face 21 of end 20 of modified camshaft 10 has been bored as shown in FIG. 3 to a sufficient depth, preferably 0.850 inches (2.15 cm) and 0.8245–0.8250 inches wide (2.09' cm), new distributor drive gear 22 is affixed to face 21 of main shaft 13 as shown in FIGS. 4 and 5.

Figure 7:
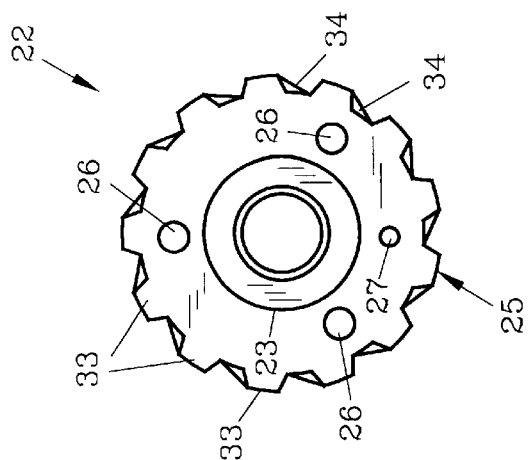
FIG. 7 shows the opposite side of the distributor drive gear from that seen in FIG. 6.
Figure 6:
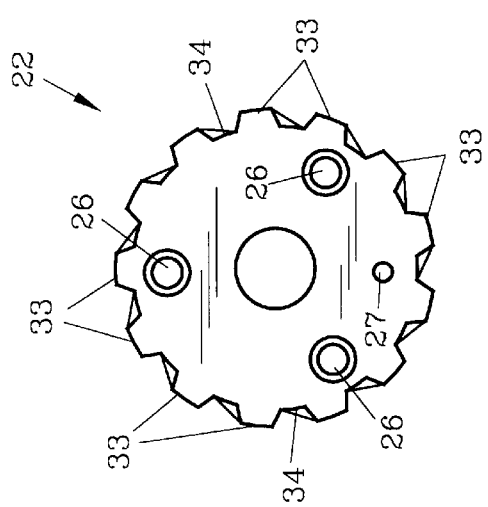
FIG. 6 shows a side view of the new distributor drive gear before attachment.
Figure 8:
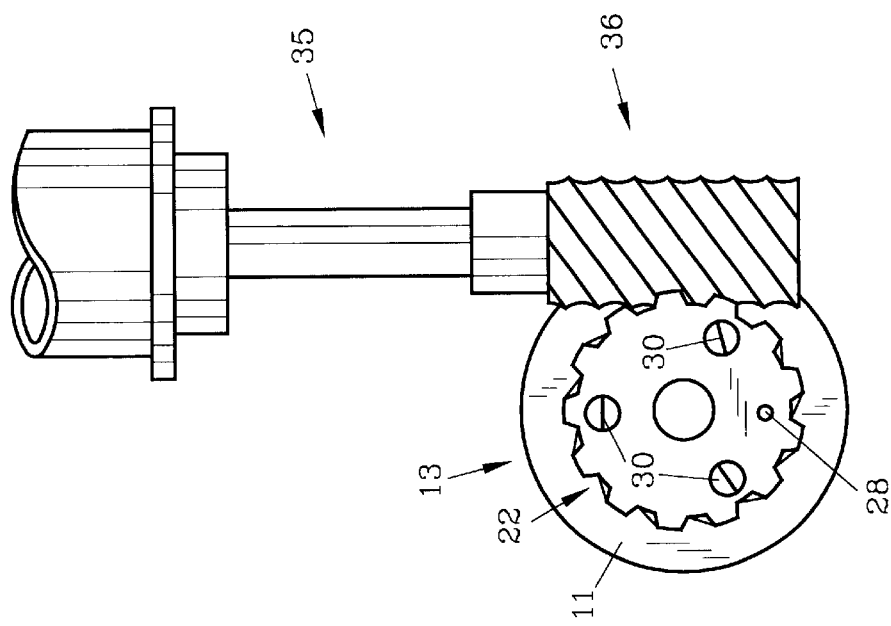
FIG. 8 demonstrates the new distributor drive gear attached to the camshaft and in engagement with a distributor shaft drive gear as mounted in an engine.

One-part distributor drive gear 22 is preferably machined with lands 33 and grooves 34 therein (seen in FIGS. 6 and 7) on wheel 25 and with extending gear shank 23 to fit within bore 31 formed in camshaft 10 by drill bit 18 as earlier explained. Wheel 25 has a diameter greater than the diameter of main shaft 13. Gear shank 23 extends preferably one (1) inch (2.54 cm) from wheel 25 and has an outside diameter of 0.825 inches (2.09 cm). Three bolt mounting holes 26 are bored at preferably 120° on a one inch circle on distributor drive gear 22 as seen in FIGS. 6 and 7. Mounting holes 26 also include recesses for the heads of threaded members 30 (FIG. 8). Aperture 27 is also drilled in drive gear 22 to accommodate mounting pin 28. Mounting pin 28 has a diameter of preferably 0.0125 inches (0.317 cm) and is positioned one-half (½) inch deep (1.27 cm) in main shaft 13 by drilling end 20 of main shaft 13 as shown in FIG. 3. Mounting pin 28 is held by frictional engagement in main shaft 13. Also, threaded openings are formed by drilling and tapping, preferably 0.3 inches deep (0.76 cm) in end 20 of main shaft 13, also at 120° for placing threaded members 30 as shown in FIG. 5 therein, which are preferably, typical 8/32 steel machine bolts.

In FIG. 8, a typical distributor drive shaft 35 is shown with drive shaft gear 36 thereon meshed with distributor drive gear 22 as mounted on main shaft 13. Other engine components are not shown for clarity purposes.

Once distributor drive gear 22 is formed and main shaft 13 prepared as described above, distributor drive gear 22 is then placed on modified camshaft 10 as shown in FIG. 4 and is attached with bolts 30 as shown in FIG. 5. The result is a modified camshaft for placement in an engine (not seen) with distributor drive gear 22 providing precise engine firing and improved fuel efficiency and performance.

Figure 12:
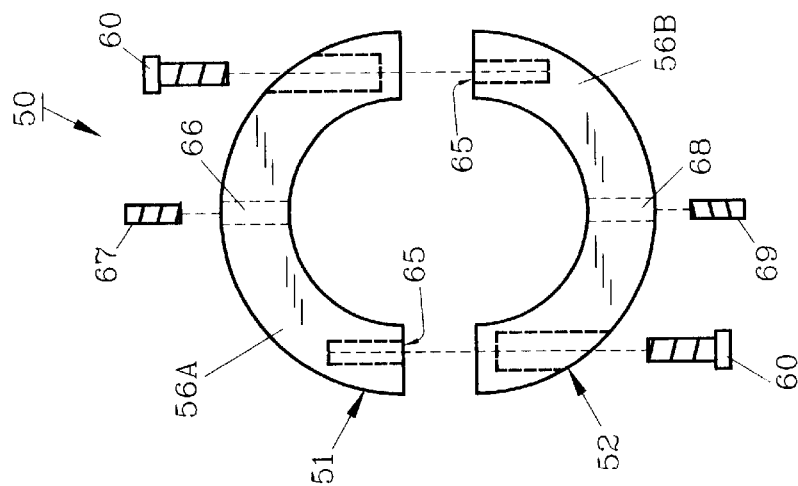
FIG. 12 pictures the distributor drive gear of FIG. 11 as along lines 12—12 in an exploded manner.
Figure 13:
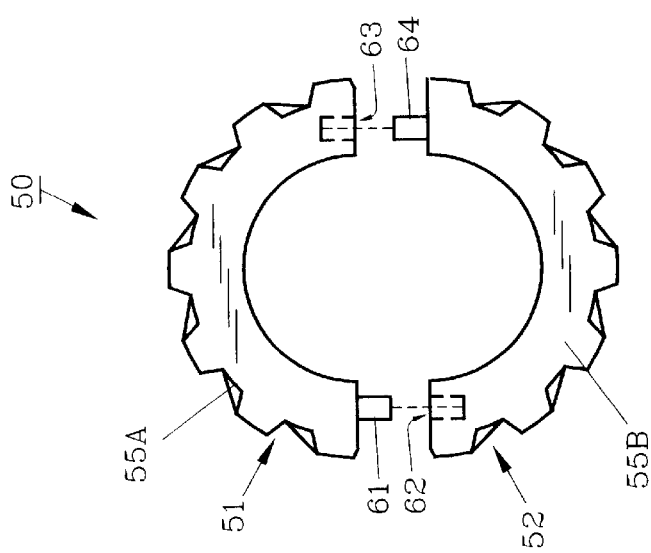
FIG. 13 features the distributor drive gear of FIG. 11 also in exploded fashion as along lines 13—13.
Figure 11:
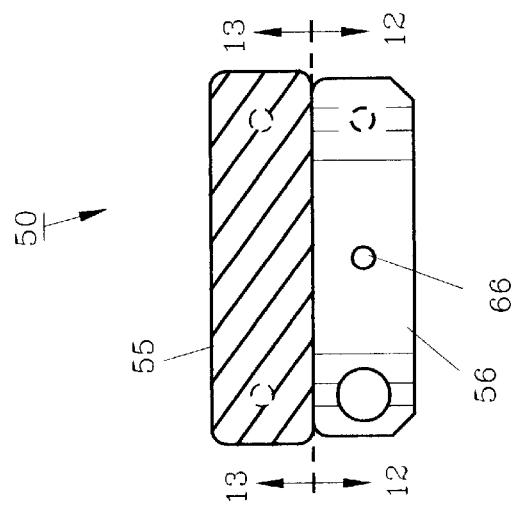
FIG. 11 shows a top view of an alternate two-part distributor drive gear in enlarged style.

In an alternate embodiment as shown in FIG. 9, billet camshaft 40 is shown as manufactured for a Chevrolet engine. Billet camshaft 40 includes distributor drive gear 41 on main shaft 42, but to the inside of journal 43 proximate cam 45. Thus, the method to remove and replace distributor drive gear 41 on camshaft 40 is as follows:

Billet camshaft 40 is placed in lathe 15 and conventional cutting tool 44 is used. Cutting tool 44 trims away distributor drive gear 41 as lathe 15 turns but leaves main shaft 42 smooth, true and intact as shown in FIG. 10. Once distributor driver gear 41 has been removed from main shaft 42, two-part distributor drive gear 50 is affixed thereto in its place as shown in FIG. 11. Distributor drive gear 50 has a length of 1.25 inches (3.17 cm) and an overall height (diameter) of 1.84 inches (4.67 cm). Drive gear 50 has an ID of 0.985 inches (2.5 cm) and includes an upper half 51 and a lower half 52 as shown in FIGS. 12 and 13. Distributor drive gear 50 includes gear wheel 55 with lands and grooves and a shank 56. Shank 56 has upper section 56A and lower section 56B which are connected by threaded members 60 as positioned in tapped (threaded) channels 65, as shown in FIG. 12. Shank 56 and gear wheel 55 are integrally formed and are made such as by first machining on a lathe and then divided by sawing or other cutting. Gear wheel 55 is likewise formed with upper section 55A and lower section 55B as seen in FIG. 13 and includes pin 61 which is 0.125 inches (0.31 cm) in diameter and resides in opening 62 on lower section 55B upon assembly. Likewise, opening 63 in upper section 55A accommodates pin 64 when distributor drive gear 50 is joined and positioned on main shaft 42 as seen in FIG. 14. Channel 66 in upper section 56A of shank 56 is tapped (threaded) for drive screw 67 and lower section 56B defines channel 68 which is tapped for drive screw 69 both of which are tightened against main camshaft 42 on opposing sides thereof to maintain distributor drive gear 50 rigidly affixed. Distributor drive gear 50 is of a two-part configuration for placement on main shaft 42. Drive screws 67, 69 are standard 10/32 drive screws.

Thus, as billet camshaft 40 is manufactured, distributor drive gear 41 as shown in FIG. 9 is generally slightly askew. By removing drive gear 41 such as by turning on a lathe, distributor drive gear 50 as shown in FIGS. 11 and 14 can be substituted therefor to improve the timing and fuel efficiency of the engine.

The illustrations and examples provided herein are for explanatory purposes and are not intended to limit the scope of the appended claims.

I claim:

1. A method for modifying a billet camshaft having an original distributor drive gear by attaching a new drive gear having an extending shaft comprising the steps of:

a) removing the original drive gear from the camshaft by cutting the camshaft along its lateral axis to remove the original drive gear;

b) finishing the cut camshaft to make it true;

c) drilling the cut, trued camshaft to form a longitudinal bore therein;

d) inserting the extending shaft of a new drive gear into the longitudinal bore; and e) attaching the new drive gear to the camshaft.

2. The method of claim 1 wherein removing the original drive gear comprises the step of turning the billet camshaft on a lathe.

3. The method of claim 2 further comprising the step of cutting the original drive gear from the billet camshaft while the billet camshaft is turned.

4. The method of claim 1 wherein boring the billet camshaft comprises the step of boring the camshaft in precise alignment with the longitudinal axis of the billet camshaft.

5. The method of claim 1 wherein attaching a new drive gear comprises the step of attaching a new upper drive gear section and a new lower drive gear section to the main camshaft.

6. The method of claim 5 further comprising the step of attaching the new drive gear with threaded members to the camshaft.

7. The method of claim 1 further comprising the step of attaching a gear mounting pin to the camshaft and inserting the attached pin into the new drive gear.

* * * * *